United States Patent
Elliot et al.

(10) Patent No.: US 9,768,428 B2
(45) Date of Patent: Sep. 19, 2017

(54) STRIP OF ELECTROCHEMICAL CELLS FOR THE PRODUCTION OF A BATTERY MODULE FOR AN ELECTRIC OR HYBRID VEHICLE, AND METHOD FOR THE PRODUCTION OF SUCH A MODULE

(71) Applicant: VALEO SYSTEMES THERMIQUES, Le Mesnil Saint Denis (FR)

(72) Inventors: Gilles Elliot, Courcouronnes (FR); Vincent Feuillard, Le Mesnil Saint Denis (FR)

(73) Assignee: VALEO SYSTEMES THERMIQUES, Le Mesnil Saint Denis (FR)

( * ) Notice: Subject to any disclaimer, the term of this patent is extended or adjusted under 35 U.S.C. 154(b) by 0 days.

(21) Appl. No.: 14/900,709

(22) PCT Filed: Jun. 26, 2014

(86) PCT No.: PCT/EP2014/063627
§ 371 (c)(1),
(2) Date: Dec. 22, 2015

(87) PCT Pub. No.: WO2014/207168
PCT Pub. Date: Dec. 31, 2014

(65) Prior Publication Data
US 2016/0156005 A1    Jun. 2, 2016

(30) Foreign Application Priority Data
Jun. 27, 2013    (FR) ...................................... 13 56203

(51) Int. Cl.
*H01M 2/02* (2006.01)
*H01M 2/10* (2006.01)
(Continued)

(52) U.S. Cl.
CPC ....... *H01M 2/1077* (2013.01); *H01M 2/0275* (2013.01); *H01M 10/613* (2015.04);
(Continued)

(58) Field of Classification Search
CPC ............. H01M 10/625; H01M 10/615; H01M 10/647; H01M 10/65714; H01M 2/0275;
(Continued)

(56) References Cited

U.S. PATENT DOCUMENTS

2005/0089750 A1    4/2005   Ng et al.
2009/0297936 A1*  12/2009   Nemoto .............. H01M 2/1061
                                                               429/152
(Continued)

*Primary Examiner* — Stewart Fraser
*Assistant Examiner* — Monique Willis
(74) *Attorney, Agent, or Firm* — Duane Morris LLP; J. Rodman Steele, Jr.; Gregory M. Lefkowitz

(57) ABSTRACT

The invention relates mainly to a system of electrochemical cells for the production of a battery module for an electric or hybrid vehicle, comprising a stack of flexible electrochemical cells, characterized in that it comprises at least one support strip with at least one electrochemical cell disposed on the surface thereof. According to the invention, the support strip can be cut such that the number of electrochemical cells disposed on the surface is adapted to provide the necessary battery power, and the strip can be folded such as to allow the electrochemical cells to be positioned side by side and stacked on top of one another.

15 Claims, 3 Drawing Sheets

Figure 4:
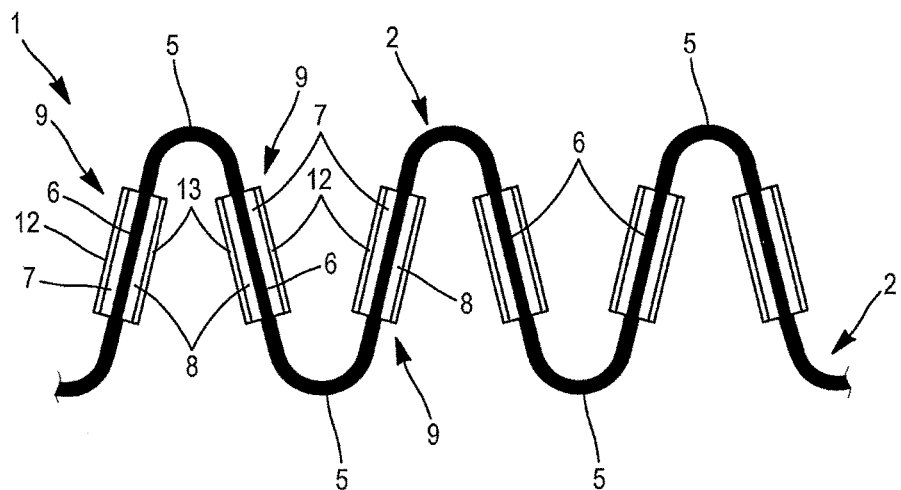

(51) Int. Cl.
*H01M 10/625* (2014.01)
*H01M 10/615* (2014.01)
*H01M 10/647* (2014.01)
*H01M 10/6571* (2014.01)
*H01M 10/6557* (2014.01)
*H01M 10/613* (2014.01)
H01M 10/6567 (2014.01)

(52) U.S. Cl.
CPC ....... *H01M 10/615* (2015.04); *H01M 10/625* (2015.04); *H01M 10/647* (2015.04); *H01M 10/6557* (2015.04); *H01M 10/6571* (2015.04); *H01M 10/6567* (2015.04); *H01M 2220/20* (2013.01)

(58) Field of Classification Search
CPC ........... H01M 10/6567; H01M 10/613; H01M 2/1077; H01M 10/6571
See application file for complete search history.

(56) References Cited

U.S. PATENT DOCUMENTS

| | | |
|---|---|---|
| 2011/0151300 A1 | 6/2011 | Herrmann |
| 2012/0094165 A1 | 4/2012 | Valencia, Jr. et al. |
| 2013/0101881 A1* | 4/2013 | Syed .................. H01M 2/1077 429/120 |
| 2013/0209847 A1 | 8/2013 | Lev et al. |
| 2015/0200428 A1* | 7/2015 | Pekarsky ............ H01M 10/625 429/120 |

* cited by examiner

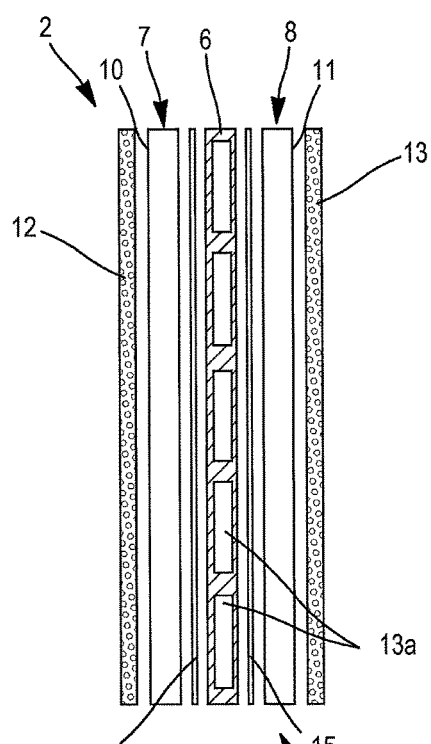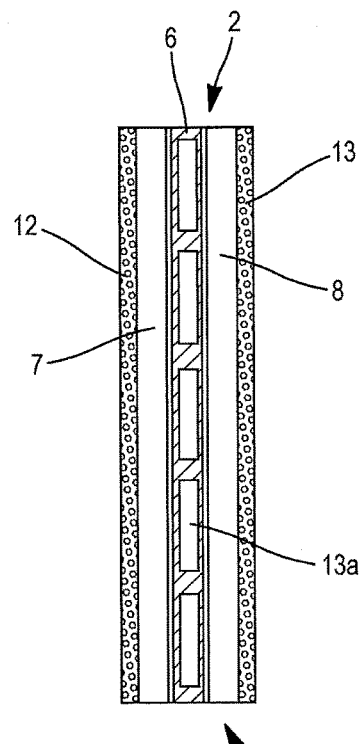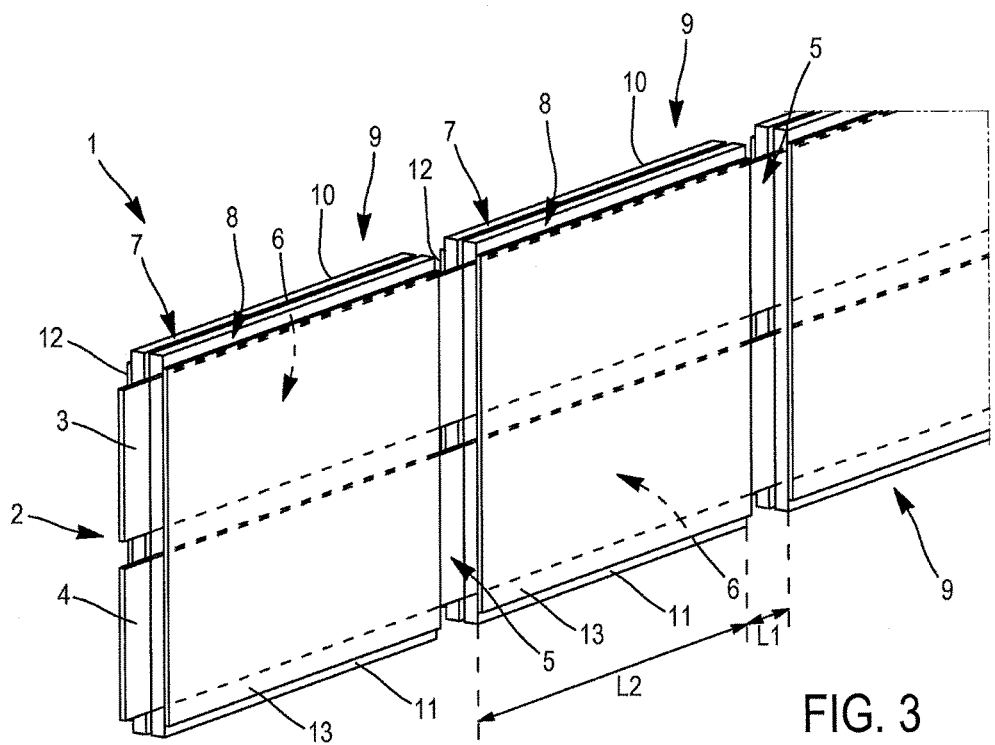

STRIP OF ELECTROCHEMICAL CELLS FOR THE PRODUCTION OF A BATTERY MODULE FOR AN ELECTRIC OR HYBRID VEHICLE, AND METHOD FOR THE PRODUCTION OF SUCH A MODULE

CROSS-REFERENCE TO RELATED APPLICATIONS

This application is a §371 national stage entry of International Application No. PCT/EP2014/063627, filed Jun. 26, 2014, which claims priority to French Patent Application No. 1356203 filed Jun. 27, 2013, the entire contents of which are incorporated herein by reference.

The invention relates mainly to a system of electrochemical cells intended to produce a battery module for an electric or hybrid vehicle.

The invention relates also to a method for producing such a module from such a system.

The technical field of the invention relates to the energy sources with electrochemical storage comprising a plurality of electrochemical cells connected in series. These energy sources apply notably to the electric batteries for ensuring the traction of electric or hybrid vehicles.

A battery comprises an assembly of modules, themselves comprising an assembly of electrochemical cells.

In these cells, reversible electrochemical reactions take place that make it possible to produce current when the battery is discharging, or to store energy when the battery is charging. The batteries of lithium-ion type are particularly known.

Electrochemical cells can be of cylindrical, prismatic or flexible type. In the flexible cell technology, commonly called "pouch-cells", each cell comprises a metal plate incorporating a positive electrode, a negative electrode and a separator. Each cell also comprises a positive terminal and a negative terminal which are each respectively linked to the negative terminal and to the positive terminal of the adjacent cells.

To produce a battery module, the flexible cells are stacked one on top of the other. The stacking has to be done in such a way that the electrochemical cells are juxtaposed accurately and in a precise direction depending on whether the stacking is of simple type, that is to say that the positive and negative terminals of the cells are all situated on one and the same side of the module, or whether the stacking is said to be alternate type, that is to say that the positive and negative terminals of the cells are in opposition. This stacking thus requires a qualified workforce and results in a not-inconsiderable assembly time.

Moreover, the chargings and dischargings of the battery provoke heat production which can result in deterioration of the cells.

Now, the construction of a battery module provided with a heat exchanger can prove complex because of the dual issue of producing the stacking of the cells and of adding the heat exchanger.

In this context, the present invention firstly targets a system that makes it possible to produce a battery module simply, with limited assembly time.

The invention further targets such a system that makes it possible to produce a battery module provided with a heat exchanger.

To this end, the system of electrochemical cells of the invention is essentially characterized in that it comprises at least one support strip on the surface of which is arranged at least one electrochemical cell, the support strip being able to be cut and folded.

In this way, the support strip can advantageously be folded so as to be able to allow the electrochemical cells to be attached together and produce a stacking of the cells one on top of the other.

According to an execution variant, the support strip can be cut in such a way that its length and the number of electrochemical cells arranged on its surface are adapted to obtain the necessary battery power.

The system of the invention can also comprise the following optional features considered in isolation or in all technically possible combinations:

at least one support strip which has an alternation of first zones on the surface of each of which is arranged at least one electrochemical cell, and of second zones without any electrochemical cells;

the support strip is thus able to be cut and folded in these second zones;

preferentially, all of the support strip can be cut and/or folded before the fitting of the electrochemical cells;

in this way, the electrochemical cells can be arranged at any point on the surface of the support strip, the parts of the support strip on which the electrochemical cells are arranged forming the first zones, the second zones being defined by the parts of the support strip on which no electrochemical cells are arranged;

each second zone of the support strip has a length and flexibility properties that make it possible to give the support strip a serpentine form comprising a succession of hair pins;

each hair pin comprising:

two first zones of the support strip that are substantially parallel;

a joining portion in the form of a circular arc corresponding to a second zone of the support strip, this joining portion linking the two first zones of the support strip;

at least one fluid circulation duct, extending between a fluid inlet and a fluid outlet, is formed in the thickness of the support strip which then forms a cooling strip;

in this way, the fluid circulation duct is arranged as close as possible to the electrochemical cell to be cooled;

preferentially, each first zone of the support strip is sandwiched between two electrochemical cells each arranged on the surface of an outer face of said first zone, each first zone of the support strip forming a double-cell unit;

each second zone of the support strip has a length and flexibility properties that make it possible to give the support strip a serpentine form comprising a succession of hair pins;

each hair pin comprising:

two substantially parallel double-cell units each comprising a first zone of the support strip sandwiched between two electrochemical cells;

a joining portion in the form of a circular arc corresponding to a second zone of the support strip, this joining portion linking said two double-cell units of the support strip;

at least one of the two cells of a double-cell unit comprises, on its face opposite the first zone of the support strip, an elastic plate, the alternation of cells provided with an elastic plate and of cells without any elastic plate making it possible to position at least one elastic plate between two cells in bearing contact against one another of two double-cell units that are adjacent and attached after folding of the relevant second zone of the support strip;

the outer face opposite the first zone of the support strip of the two cells of each double-cell unit comprises an elastic plate;

the elastic plate is a foamed plastic plate;

the support strip comprises, on at least one of its faces on the side of an electrochemical cell, a heating ply bearing with surface contact against the support strip, said heating ply being thus sandwiched between a cell and the corresponding first zone of the support strip;

the cooling strip comprises two heating plies bearing with surface contact against the opposite faces of said support strip, said heating plies being thus sandwiched between a cell and the corresponding first zone of the support strip;

the support strip and the heating ply are produced in a single piece;

each heating ply incorporates an electrical link element making it possible to link in series the electrochemical cells situated on one and the same side of the support strip;

a number of fluid circulation ducts are formed in the thickness of the support strip;

the support strip comprises a number of parallel support strips in the thickness of each of which is formed at least one fluid circulation duct which extends between a fluid inlet and a fluid outlet.

The invention relates also to a method for producing a module of electrochemical cells which is essentially characterized in that it comprises at least the steps of:

producing the system as described previously; and
accordion-folding the support strip around each of the second zones, from which results the attachment of the electrochemical cells together and the production of a stacking of cells.

Advantageously, prior to the accordion-folding, the system of cells is cut in a second zone of the support strip depending on the number of cells required in the resulting battery module.

Figure 5:
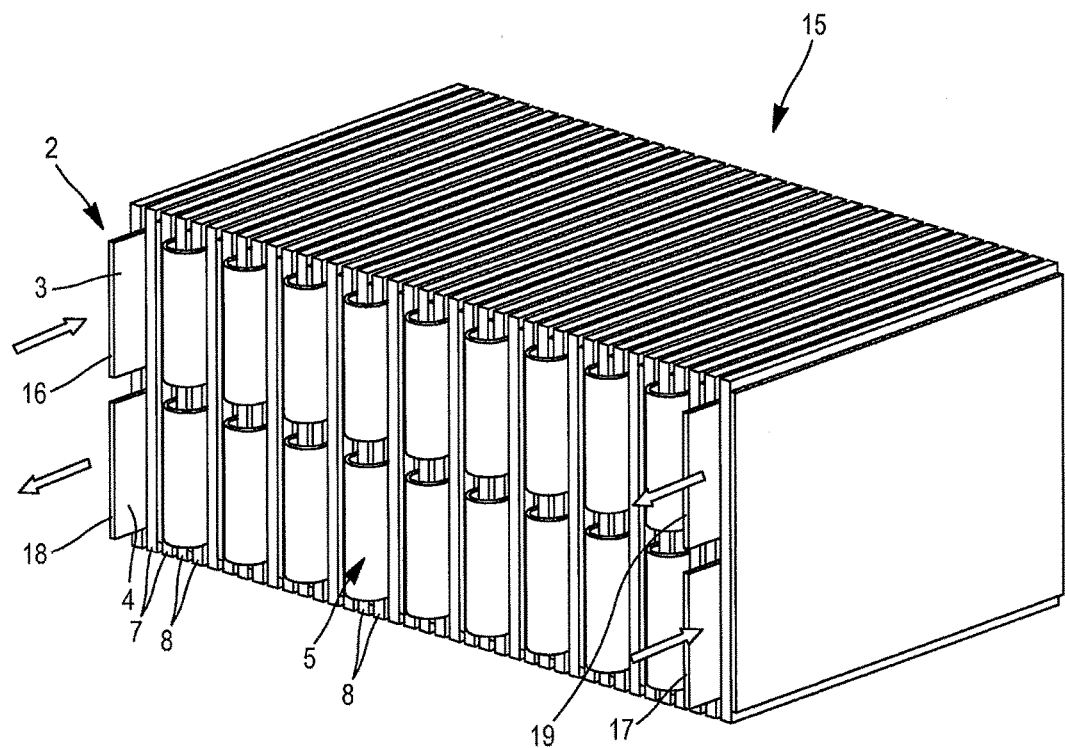
Figure 6:
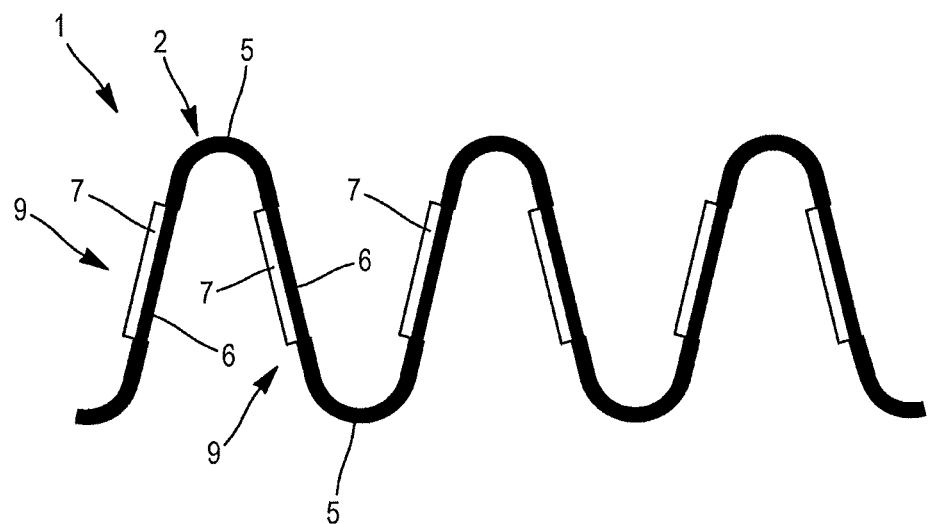
Figure 7:
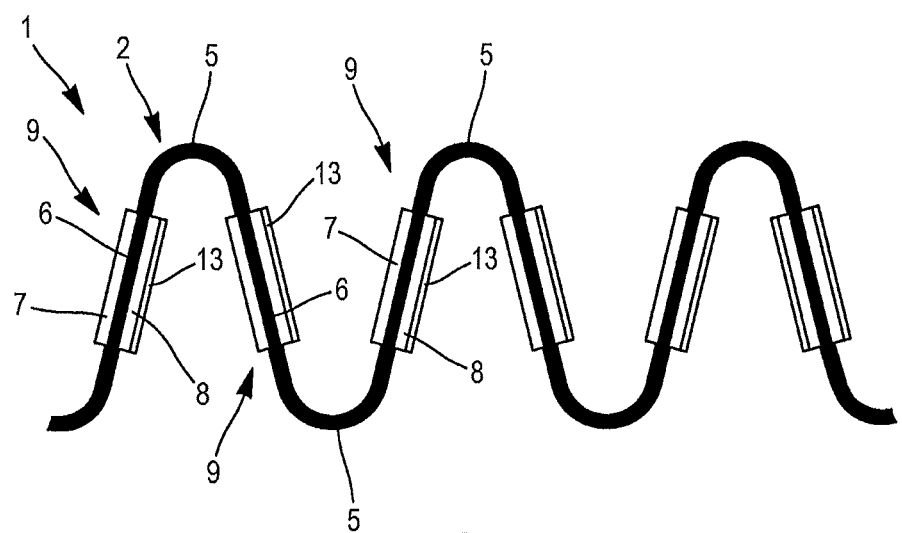

Other features and advantages of the invention will emerge clearly from the description which is given below, by way of indication and in a non-limiting manner, with reference to the attached figures in which:

FIG. 1 is an exploded transverse cross-sectional view of a double-cell unit of the system of the invention according to a first variant, FIG. 2 is a transverse cross-sectional view of a double-cell unit of the system of the invention according to the first variant, FIG. 3 is a perspective schematic representation of the system of electrochemical cells of the invention according to a second variant, FIG. 4 is a plan view of the system of electrochemical cells of the invention according to the first and second variants represented in a position of semi-assembly of the battery module, FIG. 5 is a perspective schematic representation of the battery module produced from the system of electrochemical cells of the invention according to the second variant embodiment, FIG. 6 is a plan view of the system of electrochemical cells of the invention according to a third variant represented in a position of semi-assembly of the battery module, and FIG. 7 is a plan view of the system of electrochemical cells of the invention according to a fourth variant represented in a position of semi-assembly of the battery module.

Referring to FIG. 3, the system of electrochemical cells of the invention 1 comprises a support strip 2 made of flexible plastic and comprises, in this variant, two parallel strips 3, 4, the structure of which will be described later.

The support strip 2 comprises an alternation of second zones 5 of length L1 and of first zones 6 of length L2 greater than the length L1. Each first zone 6 is sandwiched between two electrochemical cells 7, 8 thus constituting a double-cell unit 9. The system of the invention 1 thus comprises an alternation of double-cell units 9 and of second zones 5 of the support strip 2 linking each double-cell unit 9 to the adjacent unit 9.

Moreover, each cell 7, 8 comprises, on its face 10, 11 opposite the first zone 6, a foamed plastic plate 12, 13, of which the functionality within the battery module will be described later.

Referring to FIGS. 1 and 2, each double-cell unit 9 comprises, in its central part, the first zone 6 of the support strip 2. In this variant, the support strip 2 comprises a single strip and comprises five fluid circulation ducts 13 formed in its thickness and each linked to a fluid inlet and a fluid outlet that are not represented in these figures. As a variant, it is possible to provide only a single fluid inlet and a single fluid outlet for these five ducts which would be linked together by curved junctions at the ends of the support strip 2.

Generally, it is advantageous for the direction of circulation of the fluid in the five fluid circulation ducts 13 to be opposite for at least some of these ducts so as to make the cooling of each cell 7, 8 uniform.

The first zone 6 of the support strip 2 is, as already described with reference to FIG. 3, sandwiched between two electrochemical cells 7, 8 of which the faces 10, 11 opposite the support strip 2 are covered by a foamed plastic plate 12, 13.

Moreover, according to this variant embodiment, the support strip 2 comprises two heating plies 14, 15 attached to its opposite faces. Thus, each heating ply 14, 15 is sandwiched between an electrochemical cell 7, 8 and the first zone 6 of the support strip 2.

This heating ply 14, 15 makes it possible to heat up the cells 7, 8 when the battery module is used in cold climatic conditions.

Moreover, and although not visible in FIGS. 1 and 2, it is possible to provide for the heating plies 14, 15 to incorporate electrical link elements making it possible to link the electrochemical cells 7, 8 situated on one and the same side of the support strip 2. In this configuration, the cells 7, 8 of the module will further be linked in parallel by means that are not represented but are known to those skilled in the art.

Advantageously, the support strip 2 and the heating plies 14, 15 are produced in a single piece.

All the elements forming each double-cell unit 9, in other words the first zone 6 of the support strip 2, the heating plies 14, 15, the electrochemical cells 7, 8 and the foamed plastic plates 12, 13, bear with surface contact against one another.

There now follows a description of the steps of producing a battery module from the system of electrochemical cells of the invention 1.

Referring to FIG. 4, the module is produced by an accordion-folding of the system of electrochemical cells 1. More specifically, each second zone 5 of the support strip 2 is folded in the reverse direction to the adjacent second zone 5, and this is done over the entire length of the system of electrochemical cells 1.

By virtue of this accordion-folding, and by virtue of the constant length L1 of each second folding zone 5 and the constant length L2 of each first zone 6, each double-cell unit 6 is placed facing the adjacent double-cell unit 6. This folding is done until the adjacent double-cell units 6 are all attached to one another.

As represented in FIG. 5, the result thereof is the stacking of the double-cell units 9 and, thereby, the stacking of all the electrochemical cells thus constituting a battery module 15.

In this stacking, the foamed plastic plates 12, 13 are arranged between the two cells 7, 7; 8, 8 situated between two adjacent first zones 6. The foamed plastic plates 12, 13 make it possible to press the cells 7, 8 against the cooling strip and absorb the significant expansions of the cells resulting from thermal variations.

Referring to FIG. 7, each cell of the stacking 7, 8 can be insulated from its adjacent cell 7, 8 by a single foamed plastic plate 13. To do this, each double-cell unit 9 comprises only one foamed plastic plate 13 attached to just one of two cells 8. According to FIG. 7, only the cells 8 arranged on one side of the support strip 2 comprise a foamed plastic plate 13. However, provision can be made for another distribution of the foamed plastic plates 13 through the production of a particular alternation of cells comprising a foamed plastic plate 12, 13 and cells without any foamed plastic plate.

Moreover, provision can be made for the implementation of a system of electrochemical cells 2 as described previously, comprising a large number of double-cell units 9. Depending on the number of cells needed to form a particular module 15, an operation of cutting of the system of cells 1 in a second zone 5 of the support strip 2 delimiting the number of cells needed will be performed before the support strip 2 is folded.

In the variant represented in FIG. 5, corresponding to the system of cells 1 of FIG. 3, the support strip 2 comprises two support strips 3, 4 which each constitute an independent fluid circulation circuit 3, 4. Each fluid circulation duct 3, 4 extends from a fluid inlet 16, 17 to a fluid outlet 18, 19 linked to a water circuit of the vehicle. The fluid inlets 16, 17 and the fluid outlets 18, 19 are arranged opposite relative to the module 15, from which results a reversed circulation of the fluid in the first fluid circulation duct 3 relative to the second duct 4, and the uniform distribution of the coolness dissipated in each cell 7, 7 of the module 15.

Still within the context of the invention and with reference to FIG. 6, it is possible to provide for the support strip 2 to not comprise any circulation duct in its thickness. In this case, the support strip 2 forms a link strip 2 ensuring the mechanical link between the cells and making it possible to easily and quickly assemble a battery module as described and represented with reference to FIGS. 4 and 5. An additional heat exchange element will be able to be added to the battery module.

Moreover, it is also possible to provide for the presence of only a single cell 7 for cell unit 9.

In this case, and when the strip 2 forms a cooling strip 2, each cell 7 is in contact with two first zones 6 of the support strip 2 when producing the stacking.

Thus, according to the invention, the strip 2, whether it forms a cooling strip 2 or simply a link strip 2, makes it possible to produce, by a single folding operation, a flexible cell battery module. The system of cells 1 can be previously cut according to the number of cells in the module to be produced.

When the strip 2 forms a support strip 2, the latter has a dual function of mechanically linking the cells and of acting as a cooling element for these cells.

Finally, it is possible to insert, in the double-cell units 9, an electrical link and a heating ply, or even any other element that may be necessary to the operation or to the optimization of the cells of the battery module.

The invention claimed is:

1. A system of electrochemical cells for producing a battery module for an electric or hybrid vehicle comprising a stack of flexible electrochemical cells, wherein it comprises at least one support strip on the surface of which is arranged at least one electrochemical cell, the support strip being able to be folded so as to be able to allow the electrochemical cells to be attached together and produce a stacking of the cells, one on top of the other, wherein said support strip having an alternation of first zones on the surface of each of which is arranged at least one electrochemical cell, and of second zones without any electrochemical cells, the support strip being able to be folded in these second zones, and wherein the support strip also comprises, on at least one of its faces on the side of an electrochemical cell, a heating ply bearing with surface contact against the support strip, said heating ply being thus sandwiched between a cell and the corresponding first zone of the support strip.

2. The system as claimed in claim 1, wherein each second zone of the support strip has a length and flexibility properties that make it possible to give the support strip a serpentine form comprising a succession of hair pins, each hair pin comprising:

two first zones of the support strip that are substantially parallel;

a joining portion in the form of a circular arc corresponding to a second zone of the support strip, this joining portion linking the two first zones of the support strip.

3. The system as claimed in claim 1, wherein at least one fluid circulation duct, extending between a fluid inlet and a fluid outlet, is formed in the thickness of the support strip which then forms a cooling strip.

4. The system as claimed in claim 1, wherein each first zone of the support strip is sandwiched between two electrochemical cells each arranged on the surface of an outer face of said first zone, each first zone of the support strip forming a double-cell unit.

5. The system as claimed in claim 4, wherein each second zone of the support strip has a length and flexibility properties that make it possible to give the support strip a serpentine form comprising a succession of hair pins, each hair pin comprising two substantially parallel double-cell units each comprising a first zone of the support strip sandwiched between two electrochemical cells and a joining portion in the form of a circular arc corresponding to a second zone of the support strip, this joining portion linking said two double-cell units of the support strip.

6. The system as claimed in claim 4, wherein at least one of the two cells of a double-cell unit comprises, on its face opposite the first zone of the support strip, an elastic plate, the alternation of cells provided with an elastic plate and of cells without any elastic plate making it possible to position at least one elastic plate between two cells in bearing contact against one another of two double-cell units that are adjacent and attached after folding of the relevant second zone of the support strip.

7. The system as claimed in claim 4, wherein the outer face opposite the first zone of the support strip of the two cells of each double-cell unit comprises an elastic plate.

8. The system as claimed in claim 6, wherein the elastic plate is a foamed plastic plate.

9. The system as claimed in claim 1, wherein the support strip comprises two heating plies bearing with surface contact against the opposite faces of said support strip, said heating plies being thus sandwiched between a cell and the corresponding first zone of the support strip.

10. The system as claimed in claim 1, wherein the support strip and the heating ply are produced in a single piece.

11. The system as claimed in claim 1, wherein each heating ply incorporates an electrical link element making it possible to link in series the electrochemical cells situated on one and the same side of the support strip.

12. The system as claimed in claim 1, wherein a number of fluid circulation ducts are formed in the thickness of the support strip.

13. The system as claimed in claim 1, wherein the support strip comprises a number of parallel support strips in the thickness of each of which is formed at least one fluid circulation duct which extends between a fluid inlet and a fluid outlet.

14. A method for producing a battery module for an electric or hybrid vehicle comprising a stacking of flexible electrochemical cells, characterized in that it comprises at least the steps of:
   producing the system as claimed in claim 1, and
   accordion-folding the support strip around each of the second zones, from which results the attachment of the electrochemical cells together and the production of a stacking of cells.

15. The method as claimed in claim 14, wherein, prior to the accordion-folding, the system of cells is cut in a second zone of the support strip depending on the number of cells required in the resulting battery module.

* * * * *